Figure 1:
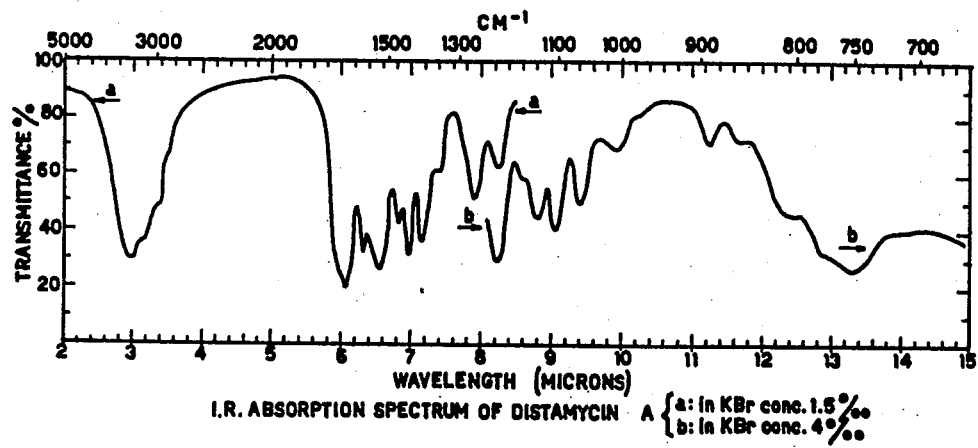
Figure 2:
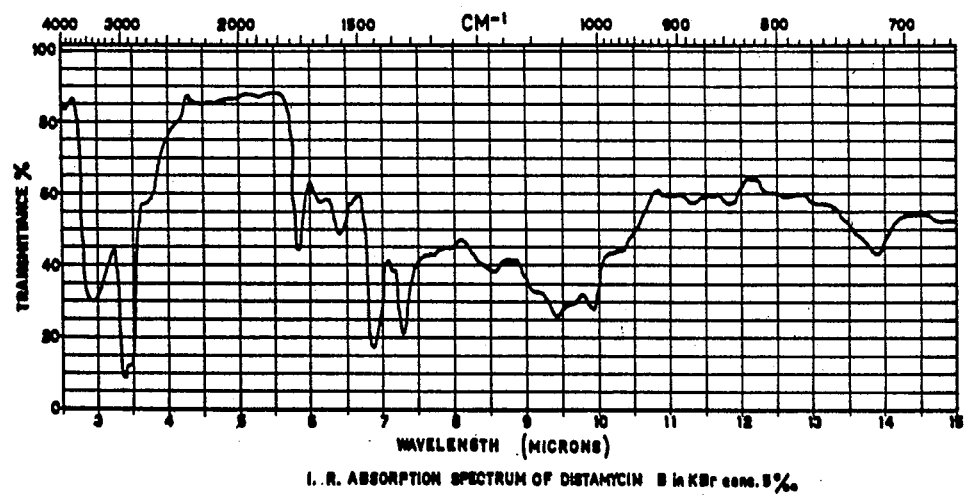
Figure 3:
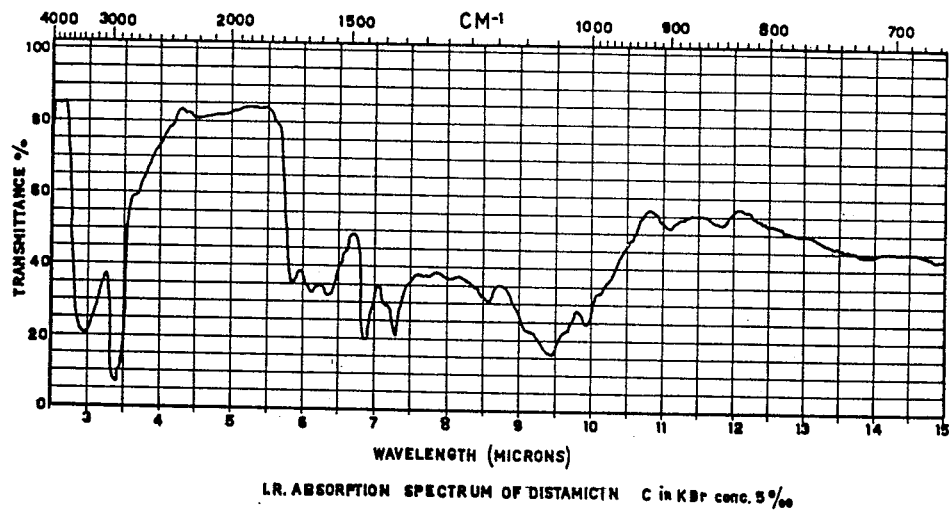

I.R. ABSORPTION SPECTRUM OF DISTAMICIN C in KBr conc. 5‰

3,190,801
ANTIBIOTIC DISTAMYCIN AND METHOD
OF PRODUCTION
Federico Arcamone, Graziana Canevazzi, and Arpad
Grein, Milan, Italy, and Franco Bizioli, Buenos Aires,
Argentina, assignors to Societá Farmaceutici Italia,
Milan, Italy, a corporation of Italy
Filed Mar. 9, 1962, Ser. No. 178,675
Claims priority, application Italy, Dec. 12, 1956,
18,229/56
8 Claims. (Cl. 167—65)

This invention relates to new antibiotics and to the methods of obtaining them.

The present application is a continuation in part of application Serial Number 702,299 filed Dec. 12, 1957, now abandoned.

We have found that a new species of Streptomyces which has been isolated by us from a soil sample in Campania in the province of Naples, Italy, produces the herein claimed new antibiotics if grown in suitable culture media.

These new antibiotics are of particular interest because of their high activity against several pathogenic fungi and schizomycetes.

The afore-mentioned species of Streptomyces, which we called "Streptomyces distallicus" (deposited in Imperial commonwealth Mycological Institute, Ferry Lane, Kew, Surrey, England, under No. 72,676 and in National Collection of Industrial Bacteria, Teddington, Middlesex, England, under No. 8,396 and at Peoria, Illinois, U.S.A., under NRRL No. 2,886, and further at Rutgers State University, New Brunswick, New Jersey, Institute of Microbiology, as No. 3,846) corresponds with neither of the species classified in Bergey's "Manual of Determinative Bacteriology" nor is it found in Wachsmann-Lechevalier's "Actinomycetes and Their Antibiotics" and in Pridham's "Applied Microbiology." It is identifiable not only by its morphological characteristics and specific features in growth-cultures, but also by its ability of producing new antibiotics.

DESCRIPTION OF THE STRAIN

S. distallicus shows, under the microscope, rather long, straight hyphae that are scarcely branched. The spores may be spherical or oval and have the following sizes: $0.8–1.5\mu \times 0.8–2\mu$). The thickness of the hyphae is about $1–1.6\mu$.

The cultural characteristics of the new strains are the following.

On yeast agar long and straight hyphae with whorls of short straight sympodial hyphae appear.

On potato agar, carrot agar and asparagine agar a vegetative mycelium is formed which on one side has a color which, upon aging, varies from the color of honey to brown, while the other side varies from fairly brown to chestnut. The aerial mycelium is scarce and shows a powdery, satiny appearance and a grayish white color during the first days of growing and subsequently a slightly cream gray color (in asparagine agar it shows a faded violet-brown).

On starch agar the vegetative mycelium varies from colorless to the color of honey, the opposite side being yellow and the aerial mycelium is slightly winepink, always powdery and satiny.

On Czapek agar the vegetative mycelium varies from colorless to the color of honey, the opposite side being yellow, whilst the aerial myeclium is grayish white.

In meat broth and peptone-glucose broth the vegetative mycelium is abundant, almost completely submerged in form of flocks; on meat broth it grows also on the surface in form of a ring which is honey-colored on one side, while the other side has a yellow color. The aerial mycelium is abundant.

On gelatine an abundant growth occurs, the vegetative mycelium being honey brown and the back yellowish brown; the aerial mycelium varies from grayish white to gray; a diffuse brown-black pigment is present.

On NZ-amine the growth is abundant; the aerial mycelium is always grayish white.

On soyabean mediums the growth is good; the vegetative mycelium is greenish, sometimes green; the aerial mycelium is velvety, grayish-white with greenish tones. A soluble brown pigment is present.

On tryptone agar the aerial mycelium is scarce and has a gray-violet color. A soluble brown pigment is present.

On asparagine-glycerin it shows smooth and yellow-brown colonies, some of them are covered by white aerial mycelium which changes them to cream color.

On potato plugs the growth is lichene-like very wrinkled and wet; both the aerial mycelium and the pigment are absent on the substrate.

In the Bennett's medium it shows smooth yellowish colonies, covered by regular velvety aerial mycelium, at first the color is white and then with gray-greenish tones; the reverse is brown-black and a brown pigment is scarcely present.

In Emerson's medium it grows both in wrinkled colonies having a cinnamon color with no mycelium and in smooth colonies covered by white-blue gray aerial mycelium.

On oats medium it grows with whitish aerial mycelium, sometimes with cinnamon colored tones; pigments are absent.

S. distallicus liquefies the gelatine to a great extent after 25 days and hydrolyzes starch to a considerable amount.

The new microorganism does not reduce the nitrates, and it grows in milk moderately (surface ring-like growth) with slight peptonisation but no coagulation.

S. distallicus ferments the following carbohydrates with production of acids: glucose, mannose, trehalose, inositol; the microorganism does not ferment; galactose, raffinose, sorbitol, arabinose, lactose, saccharose.

By considering the comparison of S. distallicus with the other known Streptomyces (ref. cited), morphologically and physiologically, it is concluded that S. distallicus is a new and distinct species of Streptomyces.

The most suitable culture medium for good mycelium growth and corresponding higher antibiotic activity consists of carbohydrates, nitrogen containing substances and inorganic salts.

As carbohydrate source can be used; glucose, saccharose, maltose, starch and also carbohydrates present in corn steep liquor.

As nitrogen source can be used: corn steep liquor, soybean flour and ammonium salts.

As inorganic salts NaCl, $CaCO_3$, $K_2HPO_4$, $MgSO_4$, $FeSO_4$ and other are added. The pH of the broth is to be about 6.6. The fermentation can be carried out in 300 ml. Erlenmeyer flasks, at 28° C., while thoroughly aerating. The highest activity occurs between 80 and 120 hours, at a pH of about 7.6.

The cultivation of the microorganism can also be carried out in the usual manner by submerged fermentation while stirring and aerating. To obtain good growth a culture broth containing one or more sources of assimilable carbon and nitrogen and salts, as described above, should be used.

Generally, the extraction of the active compounds from the cultures is carried out by treating the mycelium, separated from the culture liquor, with various solvents, such as methyl, ethyl and n.butyl alcohols, although we prefer the use of butyl alcohol. The extraction is usually carried out by agitating the mycelium with successive fractions of the solvent; the extracts are separated by centrifugation or filtration, washed with water and evaporated in vacuo. The residue is boiled with acetone; a solid product (yellowish-brown) is obtained by filtering and drying. This product has been denominated by us distamycin.

In the acetone-mother liquor remain several highly toxic by-products and a known antibiotic substance, identified as mycolutein discovered by H. Schmitz and R. Woodside (Antibiotics and Chemotherapy 5, 1955, pages 652–657), having a M.P. of 156–158° C., an empirical formula of $C_{22}H_{24}O_6N$ and maxima at the U.V. spectrum at 255 m$\mu$ $$(E^{1\%}_{1\,cm.} = 640)$$

and at 340 m$\mu$ $$(E^{1\%}_{1\,cm.} = 470)$$

Distamycin shows the ultraviolet absorption spectrum which is characteristic of a conjugated polyene. The maxima in the U.V. are found at

| $\lambda$ (m$\mu$) | $E^{1\%}_{1\,cm.}$ |
|---|---|
| 235 | 180 |
| 305 | 250 |
| 318 | 290 |
| 333 | 325 |
| 350 | 256 |
| 380 | 124 |
| 405 | 65 |

The product gives a deep violet color when treated with concentrated sulphuric acid. It is soluble in diluted acids and alkalies, but it is insoluble in ether. It is thermolabile, particularly in acidic and alkaline medium.

Chromatographic $R_f$: aqueous butanol—0.15; water saturated with butanol—0.3; butanol-pyridine-water (1:0.6:1)—0.6; butanol-acetic acid-water (2:1:1)—0.73; ammonium chloride 3%—0.04; 60% acetone—0.8; benzene-acetic acid-water (2:2:1)—0.00 (determined by bioautographies on *Candida albicans*).

The infrared absorption spectrum of distamycin shows a maximum at 2.94$\mu$ with inflection points at 3.00 and 3.05$\mu$; two sharp maxima at 6.04 and 6.33$\mu$ with inflection points at 6.10, 6.42, 6.52 and 6.58$\mu$; a less evident band at 5:85$\mu$ and a high absorption band between 6.8 and 7.3$\mu$.

From distamycin thus obtained two different fractions having a substantial antibiotic activity can be obtained by extraction with ethanol.

The first fraction (designated by us "fraction A" of distamycin and containing a new antibiotic substance called by us "distamycin A") is soluble in ethanol, whilst the second fraction (designated by us "polyenic fraction" of distamycin and containing two new antibiotic substances called by us "distamycin B" and "distamycin C") is insoluble.

From fraction A (ethanol-soluble fraction of distamycin) by filtering its solution in ethanol through alumina and eluating with ethanol, the pure distamycin A is obtained.

Distamycin A, isolated as yellowish powder, contains carbon, hydrogen, oxygen and nitrogen; the analytical data being: 49.36 carbon, 6.11 hydrogen and 23.49 nitrogen (probable empirical formula: $C_{22}H_{33}N_9O_7$). It evidences no optical rotation in alcohol solution and it is insoluble in chloroform, ethyl acetate, acetone, ether, diluted alkalies; it is very scarcely soluble in the 1:3 methanol-ether mixture; it is soluble in water and lower alcohols. It decomposes at 183–185° C. without melting.

The U.V. spectrum (in ethanol) thereof shows maxima at 237 m$\mu$ $$(E^{1\%}_{1\,cm.} = 591)$$

and 305 m$\mu$ $$(E^{1\%}_{1\,cm.} = 723)$$

Distamycin A when treated with concentrated sulphuric acid gives a brown-yellow color. Sakaguchi reaction for guanidino groups is negative. Ehrlich test is positive (coloration from purple to green).

The infrared absorption spectrum of distamycin A (FIG. I) shows in $\mu$:

Sharp maxima at: 3.04, 6.08, 6.31, 6.51, 6.79, 6.95, 7.11, 7.91, 13.30;
Less evident bands at: 8.25, 8.86, 9.06, 9.41;
Inflection points at: 3.22, 3.83, 5.94, 8.64, 12.85.

By submitting the polyenic fraction (ethanol-insoluble fraction of distamycin) in counter current distribution, by using the system methanol-chloroform-aqueous acetates buffer solution at pH=4,6 (2:2:1), the pure distamycin B and distamycin C are obtained.

By indicating the fractions obtained on the starting of the counter-current distribution as first fractions (tail fractions) and the fractions obtained at the ending of said countercurrent distribution as last fractions (head fractions), the distamycin C is recovered from the central fractions, whilst the distamycin B is found in the last fractions. In the first fractions some organic impurities and salts are present.

Distamycin B, isolated as yellowish powder, contains carbon, hydrogen oxygen and nitrogen; the analytical data being: 54.00% carbon, 7.60% hydrogen, 1.71% nitrogen (probable empirical formula: $C_{37}H_{61-63}O_{19}N$). The product is soluble in ethylcellosolve, pyridine and other aliphatic or aromatic bases, in glacial acetic acid and in dimethylformamide. It is insoluble in methanol and ethanol. It evidences optical rotation (c=0.1 in dimethylformamide): $[\alpha]_D^{20} = +305 \pm 5$. Melting point: at 180° C. it becomes brown-red without melting till 370° C.

The U.V. spectrum (in methanol) thereof shows maxima at:

| $\lambda$ (m$\mu$) | $E^{1\%}_{1\,cm.}$ |
|---|---|
| 344 | 304 |
| 362 | 625 |
| 381 | 1,050 |
| 404 | 1,200 |

Distamycin B contains a heptaenic chromophore.

With concentrated sulphuric acid it gives a violet color. Chromatographic Rf: butanol-acetic acid-$H_2O$ (20:1:25) =0.20 (on Whatman Paper No. 1).

The infrared absorption spectrum of distamycin B (FIG. II) shows:

Sharp maxima at: 2.93, 3.42, 5.86, 6.33, 6.85, 7.32, 9.38, 9.91;
Less evident maxima at: 6.12, 8.60, 11.30, 11.90, 13.9;
Inflection points at: 7.71, 7.90, 9.10, 9.65, 10.41.

The distamycin C is a white-yellowish powder soluble in ethyl-cellosolve, pyridine, in other aliphatic or aromatic bases and in dimethyl-formamide and insoluble in methanol and ethanol. The optical rotation thereof is: $[\alpha]_D^{20} = +42° \pm 5$ (c.=0.1 in dimethylformamide).

Melting point: at 160° C. it becomes brown without melting till 370° C.

The U.V.-spectrum (in methanol) shows maxima at

| $\lambda_{max}$ (m$\mu$) | $E_{1\,cm}^{1\%}$ |
|---|---|
| 304 | 165 |
| 318 | 266 |
| 333 | 368 |
| 350 | 368 |

Distamycin C contains a pentaenic chromophore.

The IR-spectrum, shown in accompanying drawing (FIG. III), is substantially identical to the one of distamycin B; for this reason we suppose that the chemical structure of distamycin C is the same of that of distamycin B, in which some double bonds are saturated.

Because of their properties distamycin or the three components distamycin A and B and C appear to be different from all the other fungicidal metabolic products of actinomycetes, which have been hitherto isolated or sufficiently characterized. They are particularly different from trichomycin, ascosin, candicidin, candidin and amphotericin B which contain a heptaenic chromophore and from β-viridin, enrocidin, netropsin and the other known antibiotics.

As a further characterisation of the hereinclaimed process it should be stated that the filtrate of the cultures of *S. distallicus* also shows an inhibitory effect on schizomycetes and fungi. The antibiotic activity of the filtrate is proportional to the production of distamycin by the microorganism.

The product obtained by means of extraction from mycelium with butanol and purification with acetone (distamycin) is active against *S. lutea, B. subtilis, Mycobacterium tuberculosis* strain 607, *Actin. boströmi, Oidium albicans, Tric. mentagrophites, Sab. gypscus, Epid. floccosum, Deb. hudeloi* and others (the minimum inhibitory doses in μg./ml. is about 10–50, when the dilution is carried out in yeast broth).

Distamycin has significant fungicidal activity for agricultural application. In Table 1 are reported the results obtained by examining the activity of distamycin against bean "rust" caused by *Uromyces appendiculatus* (Pers.) Link. on beat plants (fungicidal covering acitivity "in vivo" in conditioned room). The disease percentage was determined after the infection when pathogen uredospores appeared on the leaf surface.

Table 1

| Doses, p.p.m. | Disease percentage | |
|---|---|---|
| | Distamycin (treated) | Control (untreated) |
| 1,000 | 1.90 | 100 |
| 333 | 7.00 | 100 |
| 111 | 16.20 | 100 |

In Table 2 are reported the results obtained by examining the activity persistency "in vivo" of distamycin in conditioned room, evaluated by the covering activity in regard of *Uromyces appendiculatus*, on bean plants (fungicidal covering activity "in vivo" in conditioned room). The evaluation of immediate activity was accomplished by inoculating the leaves 6 hours after the treatment whereas for the evaluation of residual activity the leaves were inoculated 10 days after the treatment.

Table 2

| Doses, p.p.m. | Immediate activity | | Residual activity | |
|---|---|---|---|---|
| | Distamycin (treated) | Control (untreated) | Distamycin (treated) | Control (untreated) |
| 1,000 | 2.6 | 100 | 16.6 | 100 |
| 333 | 13.1 | 100 | 20.3 | 100 |
| 111 | 26.8 | 100 | 41.5 | 100 |

The sporicidal activity "in vitro" of distamycin on conydia of *Fusicladium pirinum* (Lib.) and on uredospores of *Uromyces appendiculatus*, which are the agents of the peartree "spotting" and of the bean "rust," respectively, was determined (Table 3).

Table 3

| Test fungi | Distamycin, p.p.m. | |
|---|---|---|
| | LD 50 | LD 95 |
| F. pirinum | 2.15 | 3.25 |
| U. appendiculatus | 9.00 | 18.00 |

Fungicidal activity of distamycin in Petri box on "*Cercospora beticola* (Sacc)" and "*Alternaria tenuis* Nees" which are the agents of the "smallpox" of beet leaves and of the "alternariosis" of the leaves of various kitchen-garden plants, respectively, was determined (Table 4).

Table 4

| Test fungi | Minimum inhibiting concentration, p.p.m. |
|---|---|
| Cercospora beticola | 100 |
| Alternaria tenuis | 25 |

The stability of the active substance in buffered water solution, evaluated through sporicidal activity "in vitro" was determined (Table 5).

Table 5

| Activity | LD 50, p.p.m. | LD 95, p.p.m. |
|---|---|---|
| Activity of the fresh solution | 2.15 | 3.25 |
| Activity of the solution stored 10 days | 2.30 | 3.50 |

Distamycin A is a non-toxic product, in fact its LD 50 orally as well as intraperitoneally in mice is 500 mg./kg., whilst its LD 50 when injected intravenously is 75 mg./kg.

Distamycin A is also very useful in defeating the pathogenic microorganisms, particularly schizomycetes, hyphomycetes and fungi, for animals, as demonstrated in the following tables.

Table 6

| Strains | MID in μg./ml. of distamycin A (dilution in yeast broth) |
|---|---|
| Micrococeus pyogenes aureaus cp. 114 | 50 |
| Bacillus anthracis | 50 |
| Escheritia coli ATCC 9637 | 100 |
| Pseudomonas aeruginosa | 100 |
| Oidium albicans | 50 |
| Debaryomyces neoformans | 50 |
| Tricophyton mentagrophytes | 100 |

Table 7

| Strains | MID in μg./ml. of distamycine A after 2 days of incubation in yeast-broth |
|---|---|
| Nocardia asteroides | 10 |
| Oidium albicans | 10 |
| Glenospora graphii | 10 |
| Tricophyton mentagrophytes | 10 |

The minimum inhibitory doses (in μg./ml.) of distamycin A on *M. tuberculosis* H 37 Rv are the following

| | |
|---|---|
| Dubos medium | 5 |
| Proskauer-Beck-10% serum | 50 |
| Petragnani medium | 50 |

Distamycin B displays a very high therapeutical activity. For the assay on the therapeutical activity displayed by administration of antifungus antibiotics it appears particularly suitable to carry out the experimentation on the albino mouse, whose intestinal contents as a rule is devoid of yeasts.

On said purpose, groups of animals of an average weight of 20 g. are selected and stabled at a constant diet; their faeces are examined by repeated coprocultures in Sabourad medium, in order to exclude occasional yeast carriers. Administration "per os" to the mouse of *Oidium albicans* suspensions is followed by a rapid elimination of the fungus, which disappears from the faeces within 2-3 days. When the administration "per os" of *Oidium albicans* suspension is followed by a regular daily administration of chlorotetracycline, likewise "per os," in a single dose of 50 mg./kg., a remarkable prolongation of the persistency of positive occurrences of *O. albicans* in the faeces. It is possible in practice, through antibiotic administration, to prevent indefinitely the total elimination of the fungus from the animal intestine.

In this manner it is possible to rebuild, at least partially, a biological state which can be easily observed after a prolonged administration of drugs belonging to the tetracycline group.

The oral administration, to animal, treated in this manner, of drugs with antifungus activity can lead to the partial or total sterilization of the intestinal contents of mice.

In order to ascertain the activity of the compounds under consideration the cultural essay of the faeces taken from the treated animals and the controls is carried out after 3 and 6 days of treatment.

The data obtained from the tests carried out according to said technique with distamycin B, in comparison with those obtained with nystatin (one of the most important known polyenic antibiotics) are reported in the following Table 8, wherein are indicated the percentages of negative results, there is the percentages of the tests in which the total disappearance of *Oidium albicans* was observed. Thus the absolute value of such data can be assumed as a sign of the therapeutical activity of the product.

Table 8

The drugs were administered "per os" in doses of 20 mg./kg.

| | Controls | Distamycin B | Nystatin |
|---|---|---|---|
| 3rd day | 0 | 53 | 23 |
| 6th day | 10 | 53 | 50 |

Data examination shows that the administration of distamycin B displays a clearly high action on the growth of intestine yeasts of the mouse treated with chlorotetracycline, superior to the activity of nystatin.

Distamycin B is not toxic, in fact its $LD_0$ (tolerated dose), determined in mice (orally), is >500 mg./kg.

*Trichomonas vaginalis*, in Locke medium with 10% serum, is immobilized by 10-20 λ/ml. of distamycin B after 2-4 hours.

The products of the present invention are very useful also to make seeds and other edible or gnawable articles repellent to small animals such as birds and rodents as described and claimed in coassigned copending U.S. Application Serial No. 53,375 of Dana et al., filed on September 1, 1960, and now Patent No. 3,043,743.

The following examples are presented to further illustrate our invention without intent to thereby limit the scope of the appended claims in any manner.

EXAMPLE 1.—DISTAMYCIN AND MYCOLUTEIN

A spore suspension obtained upon washing a culture of *Streptomyces distallicus* is added to 3000 ml. of a sterile medium consisting of

| | Percent |
|---|---|
| Dextrose | 2 |
| Corn steep liquor extract | 2 |
| $CaCO_3$ | 1 |
| $(NH_4)_2SO_4$ | 0.3 |
| NaCl | 0.3 |

Fermentation is continued at 28° C. for 40 hours at a stirring rate of 150-250 r.p.m. and a rate of air flow of 1-2 litre per minute per litre of culture medium.

300 ml. of a suspension of the vegetative mycelium of this culture are used for inoculating 6000 ml. of a similar sterile culture medium. At this production stage, the culture is kept fermenting for 85-100 hours (pH=7.6 at 28° C.) at a stirring rate of 350-450 r.p.m. and a rate of air flow of 1-1.5 litre per minute per litre of culture medium.

To 17 liters of a culture obtained by submerged fermentation as aforesaid, siliceous earth are added and the batch is filtered. The mixture of mycelium and the siliceous earth are agitated for 1 hour with 2.5 liters of butanol.

This treatment is repeated twice.

The butanolic extracts are combined, washed with water, evaporated to dryness (about 10 g.) and boiled with acetone (ml. 80).

The residue (g. 5.41 of yellowish powder) is distamycin.

The acetone mother liquor is evaporated to dryness and the residue is treated with ether. The filtered solid compound is crystallized from 75% aqueous acetone: mycolutein melting at 154-156° C. is obtained.

EXAMPLE 2.—DISTAMYCIN A, DISTAMYCIN B AND DISTAMYCIN C 5 grams of distamycin is extracted six times with ethanol. The ethanolic extracts are combined, concentrated and filtered through a column containing 70 g. of alumina. Eluition is carried out with the same solvent. The effluent (central fractions) is collected and evaporated to dryness to yield 0.43 g. of pure distamycin A: decomposition point=183-185° C. The product can be further purified by crystallization from aqueous n.butanol.

30 g. of a residue of ethanolic extraction is stirred twice in 200 cm.³ water for 10 minutes. The product is filtered, washed with acetone and dried in vacuo. G 14.67 of raw product is obtained.

By submitting 5 g. of said product to counter current distribution, in a Craig apparatus of 200 tubes each of 25 cm.³ by using as biphasic solvent methanol:chloroform:sodium acetate solution buffered at pH 4.6 (2:2:1), pure distamycin C is obtained by evaporating the solvent of the 50th to 110th fraction (yield 0.7 g.) and pure distamycin B is obtained by evaporating the solvent of the 130th to 170th fraction (yield: 1.64 g.).

We claim:
1. The process of producing the antibiotics distamycin and mycolutein, which comprises incubating and aerating in a liquid medium containing sources of assimilable carbon, nitrogen and mineral salts, a culture of *Streptomyces distallicus* at a temperature of about 28° C. and a pH of about 7.6 for 80–120 hours, separating mycelium from the culture medium, extracting the mycelium with a lower aliphatic alcohol, and recovering distamycin and mycolutein from the extract.

2. The process according to claim 1, comprising extracting the mycelium separated from the culture medium with butanol, evaporating to dryness in vacuo said extract, extracting with boiling acetone the highly toxic by-product and mycolutein, to obtain a residue constituted by distamycin.

3. The process according to claim 2, comprising evaporating the acetone mother liquor to dryness, treating the residue with ether and isolating the insoluble mycolutein.

4. The process according to claim 2, comprising extracting distamycin with ethanol, filtering through alumina, eluting with ethanol, collecting the central eluates, evaporating said eluates to dryness and separating the pure distamycin A.

5. The process according to claim 4, comprising extracting distamycin A from distamycin with ethanol and submitting the residue in counter-current distribution to obtain pure distamycin B in the last fractions and distamycin C in the central ones.

6. A antibiotic, distamycin A, characterized by U.V. absorption maxima at 237 and 305 m$\mu$ and an infrared absorption spectrum, as shown in the accompanying drawing, being further characterized in that, when treated with concentrated sulfuric acid a brown-yellow color appears whilst the Sakaguchi reaction for guanidino groups is negative and the Ehrlich test is positive giving a coloration from purple to green, and in that it is insoluble in chloroform, ethyl acetate, acetone, ether and diluted alkalies whilst it is soluble in water and lower alcohols and in that it shows no optical rotation in alcohol solution and in that its decomposition point is 183–185° C. (without melting) and in that it contains nitrogen, and has the following average element analysis: 49.36 carbon, 6.11 hydrogen and 23.49 nitrogen.

7. An antibiotic, distamycin B, characterized by U.V. absorption maxima at 344, 362, 381, 404 m$\mu$ characteristic for a heptaenic chromophore, and an infrared absorption spectrum as shown in the accompanying drawing, being further characterized in that, when treated with concentrated sulfuric acid it gives a violet color and in that it is insoluble in methanol and ethanol, whilst it is soluble in ethylcellosolve, pyridine and other aliphatic or aromatic bases in glacial acetic acid, and in dimethylformamide and that it shows optical rotation $[\alpha]_D^{20} = +305° \pm 5$ (c.=0.1 in dimethylformamide) and in that its decomposition point starts from 180° C. without melting till 370° C. and in that its analysis shows about 54.00% carbon, 7.6 hydrogen and 1.71 nitrogen.

8. Distamycin produced by incubating a culture of *Streptomyces distallicus* in a liquid medium, extracting the resulting mycelium with butanol, evaporating said extract to dryness, extracting the highly toxic by-products and mycolutein with boiling acetone to obtain a residue constituted by distamycin.

References Cited by the Examiner

Schmitz, Antibiotics and Chemotherapy, vol. 5, p. 652 (1955).

The Pfizer Handbook of Microbial Metalolites, 1961, p. 586.

JULIAN S. LEVITT, *Primary Examiner.*

LEWIS GOTTS, *Examiner.*